(12) United States Patent
Park et al.

(10) Patent No.: US 11,171,730 B2
(45) Date of Patent: Nov. 9, 2021

(54) METHOD AND APPARATUS FOR PERFORMING DRIVE TEST IN MOBILE COMMUNICATION SYSTEM

(71) Applicant: Samsung Electronics Co., Ltd., Suwon-si (KR)

(72) Inventors: Donghyuck Park, Yongin-si (KR); Sungrok Yoon, Seoul (KR); Sungkyu Jung, Seongnam-si (KR); Jinwook Kim, Hwaseong-si (KR); Hyesuk Kim, Suwon-si (KR); Minsung Cho, Seoul (KR); Sungbum Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 166 days.

(21) Appl. No.: 16/477,381

(22) PCT Filed: Jan. 12, 2018

(86) PCT No.: PCT/KR2018/000638
§ 371 (c)(1),
(2) Date: Jul. 11, 2019

(87) PCT Pub. No.: WO2018/131946
PCT Pub. Date: Jul. 19, 2018

(65) Prior Publication Data
US 2020/0028602 A1      Jan. 23, 2020

(30) Foreign Application Priority Data

Jan. 13, 2017  (KR) .................. 10-2017-0006433

(51) Int. Cl.
| | | |
|---|---|---|
| H04B 17/309 | (2015.01) | |
| H04B 17/24 | (2015.01) | |
| H04L 29/08 | (2006.01) | |
| H04W 84/04 | (2009.01) | |

(52) U.S. Cl.
CPC .......... *H04B 17/309* (2015.01); *H04B 17/24* (2015.01); *H04L 67/12* (2013.01); *H04W 84/042* (2013.01)

(58) Field of Classification Search
None
See application file for complete search history.

(56) References Cited

U.S. PATENT DOCUMENTS

| | | |
|---|---|---|
| 2004/0116111 A1 | 6/2004 | Saunders |
| 2008/0161005 A1 | 7/2008 | Sato et al. |
| 2011/0143682 A1 | 6/2011 | Jung et al. |
| 2011/0287778 A1* | 11/2011 | Levin .................. H04W 64/006 455/456.1 |

(Continued)

OTHER PUBLICATIONS

3GPP TS 37.320 v13 1.0, '3GPP; TSGRAN; UTRA and E-UTRA; Radio measurement collection for Minimization of Drive Tests (MDT); Overall description; Stage 2 (Release 13)'; Mar. 30, 2016.

(Continued)

*Primary Examiner* — Jenkey Van
(74) *Attorney, Agent, or Firm* — Jefferson IP Law, LLP

(57) ABSTRACT

The present disclosure relates to a communication technique for converging IoT technology with a 5G communication system for supporting a higher data transfer rate beyond a 4G system, and a system therefor. The present disclosure can be applied to intelligent services (e.g., smart homes, smart buildings, smart cities, smart or connected cars, health care, digital education, retail business, and services associated with security and safety) on the basis of 5G communication technology and IoT-related technology. A method for determining signal reception quality in a mobile communication system according to another embodiment of the present specification comprises the steps of: acquiring measurement information related to a received signal; acquiring map information corresponding to a region where the signal is received; and determining signal reception quality at a predicted reception point on the basis of the measurement information and the map information.

15 Claims, 14 Drawing Sheets

(56) References Cited

U.S. PATENT DOCUMENTS

| | | |
|---|---|---|
| 2014/0248842 A1 | 9/2014 | Yi et al. |
| 2014/0357297 A1 | 12/2014 | Futaki |
| 2015/0063135 A1* | 3/2015 | Park .................... H04W 24/08 370/252 |
| 2016/0302089 A1 | 10/2016 | Schmidt et al. |
| 2016/0330643 A1 | 11/2016 | Sahin et al. |
| 2017/0338901 A1* | 11/2017 | Zhihua ............... H04B 17/3913 |

OTHER PUBLICATIONS

Nico Deblauwe et al: "An Angle of Arrival Location Estimation Technique for Existing for Existing GSM Networks", Signal Processing and Communications, 2007. ICSPC 2007. IEEE International Conference On, IEEE, Piscataway, NJ, USA, Nov. 24, 2007 (Nov. 24, 2007), pp. 1527-1530, XP031380826, ISBN: 978-1-4244-1235-8. Mckown J W et al: "Ray tracing as a design tool for radio networks", IEEE Network, IEEE Service Center, New York, NY, US, vol. 5, No. 6, Nov. 1, 1991 (Nov. 1, 1991), pp. 27-30, XP011419221, ISSN: 0890-8044, DOI: 10.1109/65.10380.
Chen Z et al: "Radio-wave propagation 1-15 prediction using ray-tracing techniques on a network of workstations (Now)", Journal of Parallel and Distributed Computing, Elsevier, Amsterdam, NL, vol. 64, No. 10, Oct. 1, 2004 (Oct. 1, 2004), pp. 1127-1156, XP004571304, ISSN: 0743-7315, DOI: 10.1016 J. JPDC.2004.07.004.
Extended European Search Report dated Nov. 11, 2019, issued in European Application No. 18738957.2-1219.

\* cited by examiner

METHOD AND APPARATUS FOR PERFORMING DRIVE TEST IN MOBILE COMMUNICATION SYSTEM

TECHNICAL FIELD

Embodiments of the disclosure relate to a method and apparatus for performing a drive test for measuring a communication environment in a mobile communication system. Specifically, embodiments of the disclosure relate to a drive test method and apparatus for a communication system using a super-high frequency (mmWave).

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the 5G communication environment, a method for performing a drive test for cell deployment and the like is required. A typical drive test is to measure a communication environment while moving in an environment where a transmitter is disposed, and to determine cell deployment and a signal transmission scheme based on the measured communication environment. The typical drive test is, however, designed for a communication system having a frequency near 800 MHz, so that a suitable drive test technique for a communication system using a super-high frequency (mmWave) is required.

DISCLOSURE OF INVENTION

Technical Problem

Embodiments of the disclosure are to provide a method and apparatus for measuring a channel environment of a wireless communication system. Particularly, embodiments of the disclosure are to provide a method and apparatus for performing a drive test for a 5G communication environment using mmWave.

Solution to Problem

A method for determining a signal reception quality in a mobile communication system according to an embodiment of the disclosure includes obtaining measurement information related to a received signal; obtaining map information corresponding to an area where the signal is received; and determining the signal reception quality at a predicted reception point, based on the measurement information and the map information.

A method for determining a signal reception quality in a mobile communication system according to an embodiment of the disclosure includes obtaining measurement information related to a received signal at a specific position, based on beamforming information of a transmission signal; determining a path through which the received signal is to be transmitted from the specific position, based on the measurement information; determining a predicted reception point, based on the determined path; and determining the signal reception quality at the predicted reception point, based on the measurement information.

A method for determining a signal reception quality in a mobile communication system according to an embodiment of the disclosure includes obtaining, in connection with a signal transmitted by a transmitter and measured, measurement information including at least one of a measuring position of the signal, a reception quality of the signal, and a reception direction of the signal; determining information related to a first path extended from the measuring position and through which the signal will be traveled, based on the measurement information; determining at least one signal reception candidate; determining a predicted signal reception region, based on the signal reception candidate and the information related to the first path; and determining the signal reception quality in the predicted signal reception region, based on the measurement information.

A computing apparatus for determining a signal reception quality in a mobile communication system according to an embodiment of the disclosure includes an interface obtaining information; and a controller configured to control the interface, to obtain, in connection with a signal transmitted by a transmitter and measured, measurement information including at least one of a measuring position of the signal, a reception quality of the signal, and a reception direction of the signal, to determine information related to a first path extended from the measuring position and through which the signal will be traveled, based on the measurement information, to determine at least one signal reception candidate, to determine a predicted signal reception region, based on the signal reception candidate and the information related to the first path, and to determine the signal reception quality in the predicted signal reception region, based on the measurement information.

A non-volatile storage medium according to an embodiment of the disclosure stores a program that includes instructions for determining a signal reception quality in a mobile communication system and executing operations of obtaining, in connection with a signal transmitted by a transmitter and measured, measurement information including at least one of a measuring position of the signal, a reception quality of the signal, and a reception direction of the signal; determining information related to a first path extended from the measuring position and through which the signal will be traveled, based on the measurement information; determining at least one signal reception candidate; determining a predicted signal reception region, based on the signal reception candidate and the information related to the first path; and determining the signal reception quality in the predicted signal reception region, based on the measurement information.

A signal quality measuring apparatus in a mobile communication system according to an embodiment of the disclosure includes an antenna for measuring direction information of a signal transmitted by a transmitter and reception quality information of the signal; a position measurement module for measuring a position where the signal is received; and a shielding unit for shielding signal reception of a path corresponding to a line of sight from the transmitter, based on a position of the transmitter.

Advantageous Effects of Invention

According to embodiments of the disclosure, it is possible to more accurately measure a communication environment in a wireless communication system. Specifically, it is possible to provide a more accurate drive test method and apparatus for a communication system utilizing mmWave, and to infer a communication environment at an actual signal reception point based on information received in a drive test.

MODE FOR THE INVENTION

Figure 1:
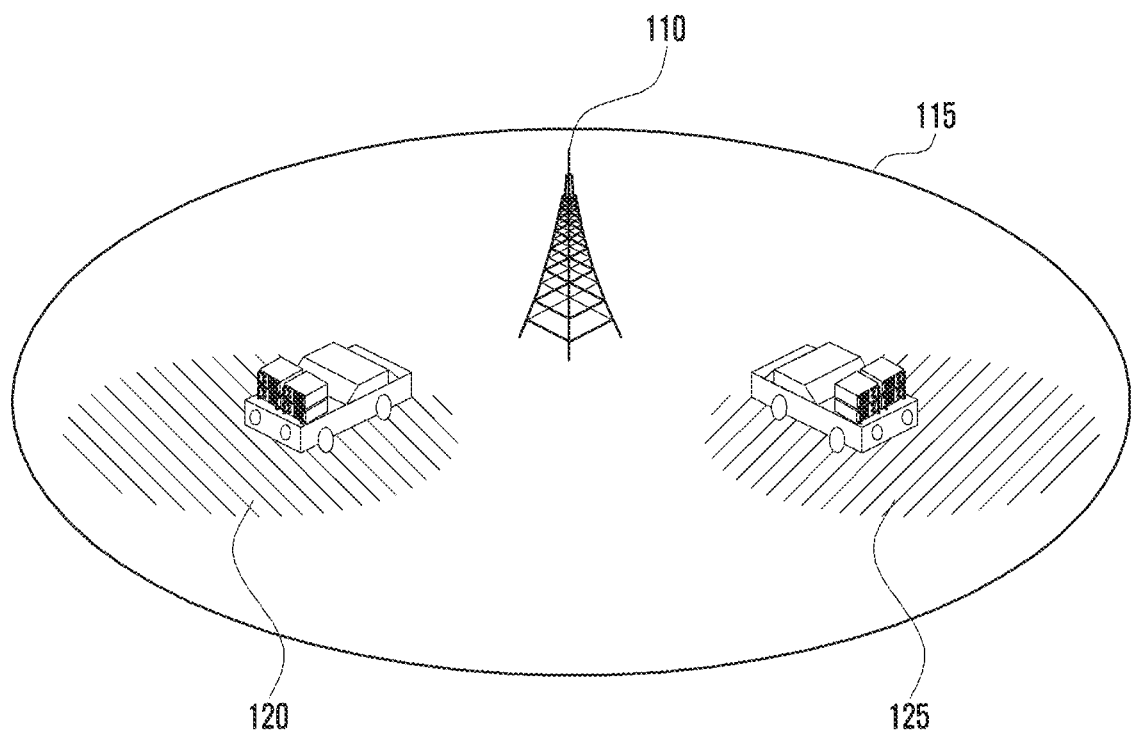
FIG. 1 is a diagram illustrating a drive test.

Hereinafter, embodiments of the disclosure will be described in detail with reference to accompanying drawings.

In the following description of embodiments, descriptions of techniques that are well known in the art and not directly related to the present invention are omitted. This is to clearly convey the subject matter of the invention by omitting any unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present invention and the manner of achieving them will become apparent with reference to the embodiments described in detail below and with reference to the accompanying drawings. The present invention may, however, be embodied in many different forms and should not be construed as being limited to the embodiments set forth herein. Rather, these embodiments are provided so that this invention will be thorough and complete and will fully convey the scope of the invention to those skilled in the art. To fully disclose the scope of the invention to those skilled in the art, the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, refers to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

According to an embodiment of the disclosure, it is possible to provide more accurate measurement results by considering the characteristics of mmWave in addition to measuring a signal reception quality through the existing drive test. Specifically, it is possible to acquire measurement information related to a received signal, acquire geographical characteristic information corresponding to an area where the signal is received, and determine a signal reception quality at a predicted reception point. As such, by considering both the measurement information and the geographic characteristic information together, the signal reception quality can be determined at the predicted reception point. The characteristic information may include at least one of topographic information, building information, and plant information on a map.

In addition, according to an embodiment of the disclosure, it is possible to acquire measurement information related to a received signal at a specific position, based on beamforming information of a transmission signal. By considering the beamforming information, measurement information more suitable for the 5G communication can be obtained, and a predicted reception point can be determined to determine a signal reception quality. As such, by considering additional information elements, it is possible to determine the signal quality through more accurate drive test. The transmission signal information may include a beam index of a transmission signal. Specifically, the beam index may correspond to a signal transmission direction according to beamforming, and when a plurality of signals are received at the predicted signal reception point, a beam index having an optimum signal quality may be determined from among the received signals. Also, based on this, a transmitter may determine a signal transmission method.

FIG. 1 is a diagram illustrating a drive test.

Referring to FIG. 1, when a base station 110 transmits a signal, a terminal may receive the signal within a cell 115. In principle, the signal attenuation occurs in proportion to the square of a distance from the base station 110, so that the transmission/reception power may be determined based on this. However, an actual signal reception environment may vary due to the influence of geographic features in the cell 115. It is therefore needed to measure a signal reception quality while moving drive test apparatuses 120 and 125 within the cell 115. This is called a drive test. Through the drive test, at least one of information about a position where a signal is received, information about received signal power at the position, and information about a signal reception direction at the position may be collected. In an embodiment, the direction information may include at least one of angle information in the horizontal direction and angle information in the vertical direction. By performing the drive test as described above, it is possible to determine the signal reception quality in an actual environment and, based on this, determine cell deployment and transmission power. The received signal power is a parameter indicating the signal reception quality and may include, in an embodiment, information such as SNR, SINR and signal receiving sensitivity.

Figure 2:
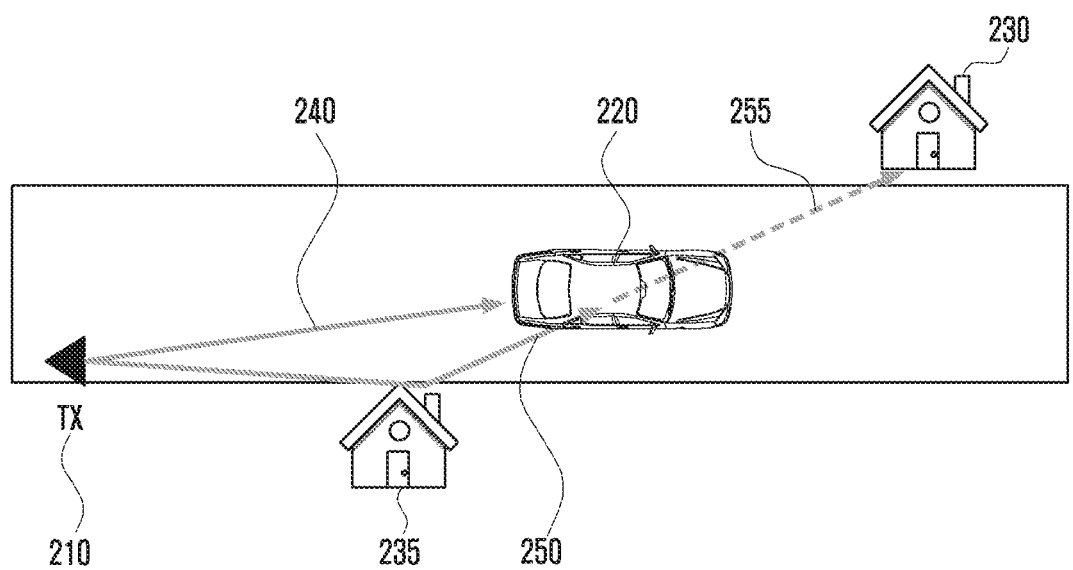
FIG. 2 is a diagram illustrating a method for performing a drive test in a communication system using mmWave according to an embodiment of the disclosure.

FIG. 2 is a diagram illustrating a method for performing a drive test in a communication system using mmWave according to an embodiment of the disclosure.

Referring to FIG. 2, a drive test apparatus 220, which is moving, may measure a signal transmitted from a transmitter 210. Specifically, while moving, the drive test apparatus 220 may collect at least one of information about a position where the signal transmitted by the transmitter 210 is received, information about received signal power at the position, and information about a signal reception direction at the position. In an embodiment, the drive test apparatus 220 is a device capable of measuring signal-related information while moving, including at least one of a vehicle, a drone, an airplane, a helicopter, and a train, and may include any other movable device on which signal measuring equipment is mounted.

In an embodiment, the measurement may not be performed for a signal 240 received from the transmitter 210 on the line of sight. Specifically, the drive test apparatus 220 may perform radio wave shielding in the direction of the transmitter 210 so as not to perform the measurement for the signal 240 received on the line of sight. The characteristics of mmWave and beamforming signals have a high directivity, so that a signal component received on the line of sight may not directly affect a signal reception quality in an actual reception environment. Therefore, the measurement for the signal received on the line of sight may be blocked. Specifically, a road on which a drive test is performed may have few elements acting as obstacles to signal transmission, so that any position on the road may be placed on the line of sight from the transmitter 210. However, a reception position 230 where actual signal reception is likely to occur may be often placed out of the line of sight, so that in order to more accurately reflect such characteristics, no consideration of a signal component received on the line of sight or a consideration with a lower importance is needed. Therefore, the drive test apparatus may include a shielding unit for blocking a signal received on a path corresponding to the line of sight based on the position of the transmitter. The shielding unit may be provided at a position corresponding to a direction of the transmitter in the drive test apparatus.

In addition, the drive test apparatus 220 may receive a signal 250 reflected through a reflector 235 and perform measurement for this signal. Then, based on at least one of information about a signal reception position, information about received signal power at the position, and information about a signal reception direction at the position, it may be predicted that the signal will be extended and transmitted from the reception position as indicated by reference numeral 255. Accordingly, by predicting the propagation characteristics of the extended transmission signal, it is possible to predict the quality of a signal to be received at the reception position 230 and, based on this, obtain a drive test result similar to an actual signal transmission environment. As such, because mmWave is greatly influenced by a communication channel environment between the measurement position and the reception position 230, it is necessary to reflect such a result.

In an embodiment, the reception position 230 may include a position where a receiver is placed, and especially include a building where a user terminal or a repeater is placed. Such building information may be obtained through three-dimensional map information. In a certain embodiment, the reception position may be determined based on a repeater installation location of an operator.

As described above, the drive test may obtain information related to a received signal and also obtain a drive test result similar to an actual communication environment based on a channel environment of an extended path on which the received signal is continuously transmitted from a reception position.

Figure 3:
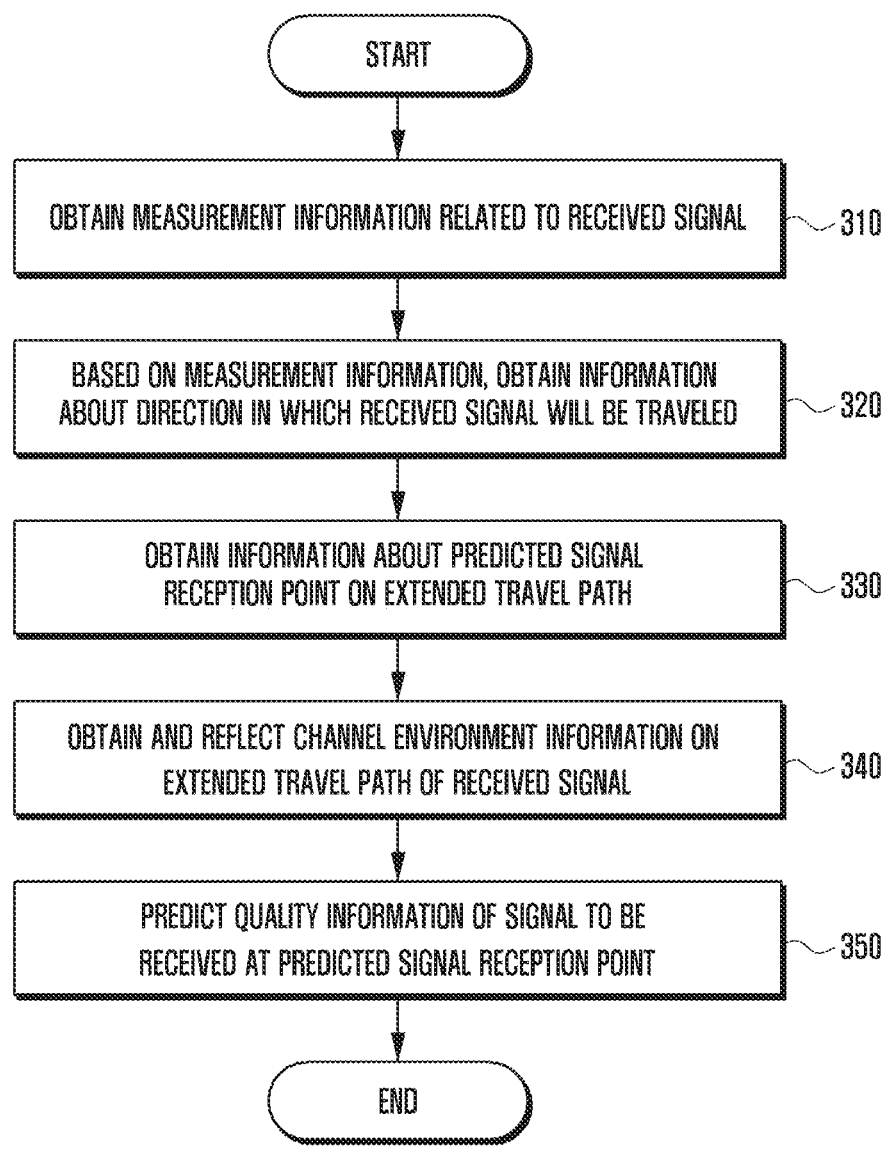
FIG. 3 is a diagram illustrating a method for predicting signal quality information at a signal reception position based on a drive test according to an embodiment of the disclosure.

FIG. 3 is a diagram illustrating a method for predicting signal quality information at a signal reception position based on a drive test according to an embodiment of the disclosure.

Referring to FIG. 3, based on a drive test according to an embodiment, signal quality information may be predicted at a signal reception position. Specifically, the drive test is performed through a measuring device, and an additional operation for predicting the signal quality information may be performed in a separate computing apparatus based on measurement information obtained through the drive test. Alternatively, the additional operation may be also performed in the measuring device, which can be easily modified by a person skilled in the art.

At step 310, measurement information related to a received signal may be obtained through the drive test. Specifically, during a movement for the drive test, it is possible to obtain reception information of a signal transmitted from a transmitter. More specifically, at least one of information about a position where a signal is received, information about received signal power, and information about a signal reception direction may be obtained. In addition, any information contained in the received signal may be obtained. Such information may include information about a transmitter that has transmitted the received signal, and also information about a time when the signal is received.

At step 320, based on the measurement information, information about a direction in which the received signal will be traveled may be obtained. Specifically, by considering the signal reception position information and the signal reception direction information in the measurement information, it is possible to obtain the information about a direction in which the signal will be traveled when going straight. More specifically, based on the signal reception position and direction, information about a straight line corresponding to the progress of the signal may be obtained and represented by an equation.

At step 330, information about a predicted signal reception point may be obtained on an extended path through which the signal will be traveled. Specifically, it is possible to obtain the information about the predicted signal reception point that intersects with the extended path through which the signal will be advanced. The predicted signal reception point may be, for example, a building and may include a place where a user terminal or a repeater is located. Such information may be acquired through map information. That is, the predicted signal reception point information may be obtained in a space through three-dimensional map information.

At step 340, information between the signal measurement point and the predicted signal reception point may be obtained, and channel environment information may be obtained based on the above information to determine signal transmission characteristics. Specifically, the signal transmission characteristics may be determined based on objects located on a travel path of the signal from the signal measurement position, obtained based on the map information in the drive test, to the predicted signal reception point determined at step 330. More specifically, the signal transmission characteristics may be determined considering at least one of scattering, reflection, transmission, and blocking of a signal due to objects located on the path.

At step 350, the computing apparatus may predict quality information of the signal to be received at the predicted signal reception point. As such, by predicting the signal reception quality at an actual signal reception point on the basis of information measured through the drive test, it is possible to obtain prediction information that is more similar to an actual environment.

Figure 4:
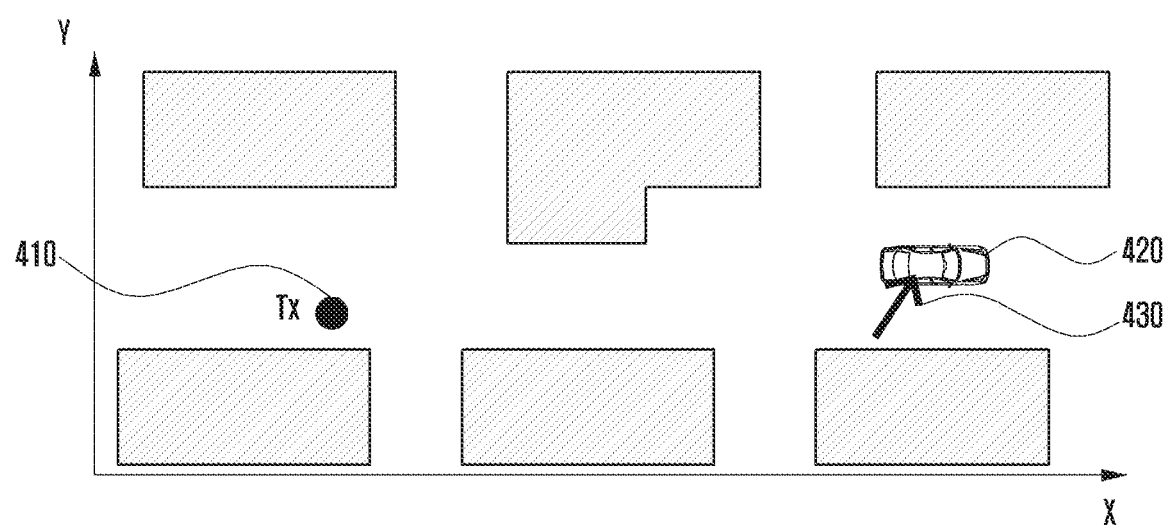
FIG. 4 is a diagram illustrating a method for performing a measurement in a drive test according to an embodiment of the disclosure.

FIG. 4 is a diagram illustrating a method for performing a measurement in a drive test according to an embodiment of the disclosure.

Referring to FIG. 4, a drive test apparatus 420 may receive a signal 430 transmitted by a transmitter 410. In an embodiment, the drive test apparatus 420 may not measure a signal received via a path corresponding to the line of sight from the transmitter 410.

Also, in an embodiment, the drive test apparatus 420 may receive the signal 430 transmitted by the transmitter 410 while moving, and obtain at least one of reception position information, received power information, reception direction information, and reception time information in connection with the received signal.

In an embodiment, the drive test apparatus 420 may obtain signals received in all directions. Specifically, by using a plurality of receiving antennas, by mechanically rotating an antenna, or through an electrical signal rotation, the apparatus may receive signals in all direction and obtain signal reception direction information. Also, in an embodiment, the receiving antenna may be an omnidirectional antenna or may be implemented in the form of arranging a plurality of antennas in all directions. In this embodiment, omnidirectional may refer to include any direction in which a signal can be received, and the signal measurement may be set not to be performed for some direction in which signal reception is difficult. Also, in an embodiment, the drive test apparatus 420 may perform the measurement while forming different reception beams and sweeping all directions.

In addition, based on beamforming information of the transmitter 410, the drive test apparatus 420 may perform the measurement while sweeping the reception beams in all directions. In this case, a beamforming scheme of transmission beams may be determined based on surrounding terrain information. Specifically, when the transmitter is installed in vicinity of a road, the transmission beam for transmitting a signal may be determined in a direction favorable to signal transmission/reception such as the road having few fixed object. Therefore, based on the direction of the determined transmission beam, the reception beam may be formed and thereby the signal measurement may be performed.

Also, in an embodiment, the signal reception direction information may include incident angle information of a received signal based on a specific coordinate system. In an embodiment, the specific coordinate system may include the Cartesian coordinate system, and the direction information may include at least one of azimuth angle information in the horizontal direction and elevation angle information in the vertical direction. In an embodiment, such angle information of a received signal may be referred to as an angle of arrival (AOA).

In the three-dimensional coordinates, position information and AOA information of the received signal 430 may be obtained. Specifically, the information of the received signal 430 may be mapped on the three-dimensional map coordinates. Then, based on the information of the received signal 430 and a path of the received signal 430 to the drive test apparatus 420, it is possible to determine a communication environment of an extended path of the signal to be traveled. Therefore, it is possible to more accurately predict a signal reception quality at a position predicted as a reception point.

Figure 5:
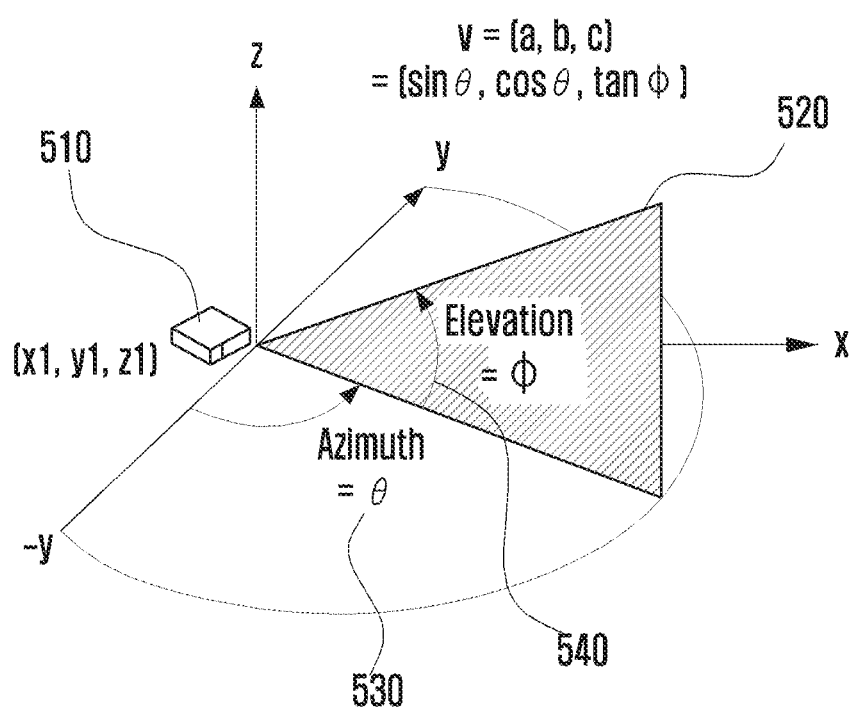
FIG. 5 is a diagram illustrating a method for measuring information related to a received signal in a drive test according to an embodiment of the disclosure.

FIG. 5 is a diagram illustrating a method for measuring information related to a received signal in a drive test according to an embodiment of the disclosure.

Referring to FIG. 5, a drive test apparatus 510 may measure a received signal 520. In an embodiment, the drive test apparatus 510 may obtain at least one of information about an azimuth angle 530 of the received signal and information about an elevation angle 540 of the received signal. Then, the apparatus may obtain vector information related to a travel direction of the received signal and, based on the vector information, obtain path information considering the extended progress of the signal.

Figure 6:
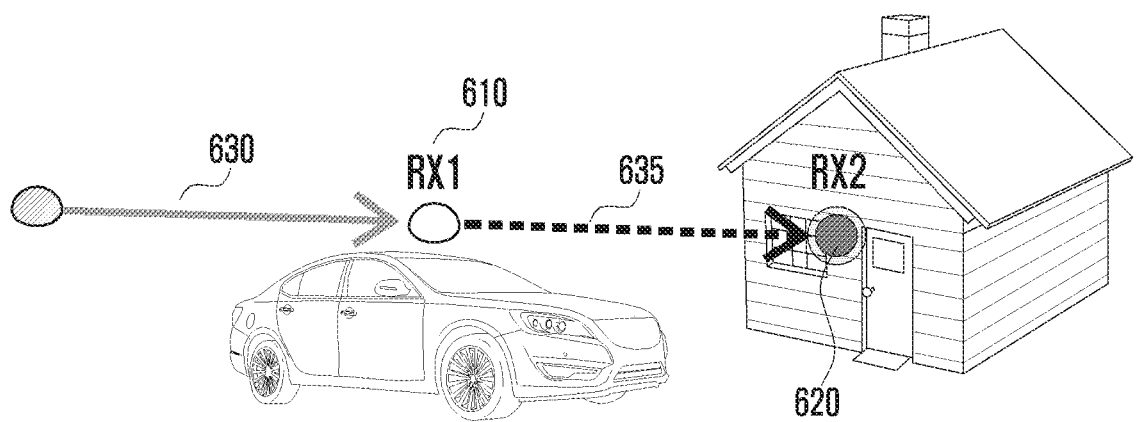
FIG. 6 is a diagram illustrating a scheme of predicting a signal travelling direction in a drive test according to an embodiment of the disclosure.

FIG. 6 is a diagram illustrating a scheme of predicting a signal travelling direction in a drive test according to an embodiment of the disclosure.

Referring to FIG. 6, based on information related to a received signal 630, a drive test apparatus 610 may determine an extended path 635 on which the signal will be traveled. Specifically, based on direction information of the received signal 630, the drive test apparatus 610 may determine the path extended from a signal reception point. A path of the received signal 630 and the extended path 635 may be placed in a straight line, so that the drive test apparatus 610 may determine the extended path 635 on the basis of the direction information of the received signal 630. When a predicted reception point 620 is located on the extended path, the drive test apparatus 610 may predict the quality of a signal to be received at the predicted reception point 620 in consideration of the information of the received signal 630 and the transmission environment of the extended path 635.

Specifically, the direction cosine u of the signal received at the drive test apparatus 610 may be defined as (u1, u2, u3) in the three-dimensional coordinate system. An equation of a straight line parallel to the direction cosine u and passing through a point (x1, y1, z1) which is a reception position in the three-dimensional coordinate system may be defined as follows.

$$\frac{x-x_1}{u_1} = \frac{y-y_1}{u_2} = \frac{z-z_1}{u_3} (u_1, u_2, u_3 \neq 0)$$

Also, in an embodiment, the equation of a straight line parallel to a signal vector v=(a, b, c) and passing through the point (x1, y1, z1) which is the reception position may be defined as follows.

$$\frac{x-x_1}{a} = \frac{y-y_1}{b} = \frac{z-z_1}{c} (a \neq 0, b \neq 0, c \neq 0)$$

The extended path of a signal may be determined on the basis of such equations of a straight line. When there is a predicted reception region on the extended path, it is possible to determine, based on an intersecting point between the extended path and a plane constituting the predicted reception region, whether the signal reaches the predicted reception region.

Specifically, in an embodiment, a plurality of signals having different paths may be received at the predicted reception point 620. Beam indexes of the plurality of received signals may be obtained during a measurement process, and the computing apparatus may determine a beam index having the optimum signal quality when the plurality of signals having different paths are received. Based on the beam index information of the optimal signals, the transmitter may determine a next signal transmission method.

Figure 7:
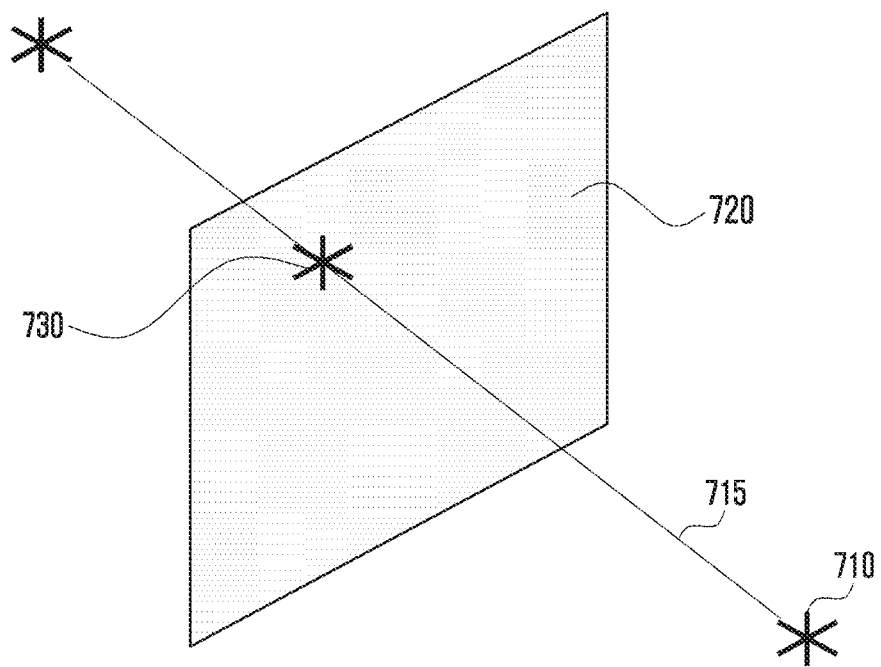
FIG. 7 is a diagram illustrating a method for determining a plane intersecting with a signal traveling direction according to an embodiment of the disclosure.

FIG. 7 is a diagram illustrating a method for determining a plane intersecting with a signal traveling direction according to an embodiment of the disclosure.

Referring to FIG. 7, an extended path of a signal from a reception position 710 may be determined according to an equation. Also, an equation of a plane forming a predicted reception point may be obtained in consideration of map information and the like. Basically, an equation of a plane passing through a point A (x1, y1, z1) and perpendicular to a vector h=(a, b, c) may be determined as a(x−x1)+b(y−y1)+c(z−z1)=0. Also, an equation of a plane perpendicular to h=(a, b, c) may be determined as ax+by+cz=0. It is possible to determine whether there is an intersecting point between a plane and a straight line, and thereby determine a plane with which a signal intersects.

Specifically, in an embodiment, there may be a plane 720, and there may be an intersecting point 730 with a straight line. When there is the intersecting point 730, it may be predicted that a signal arrives at a predicted reception point constituted by the plane 720.

Figure 8:
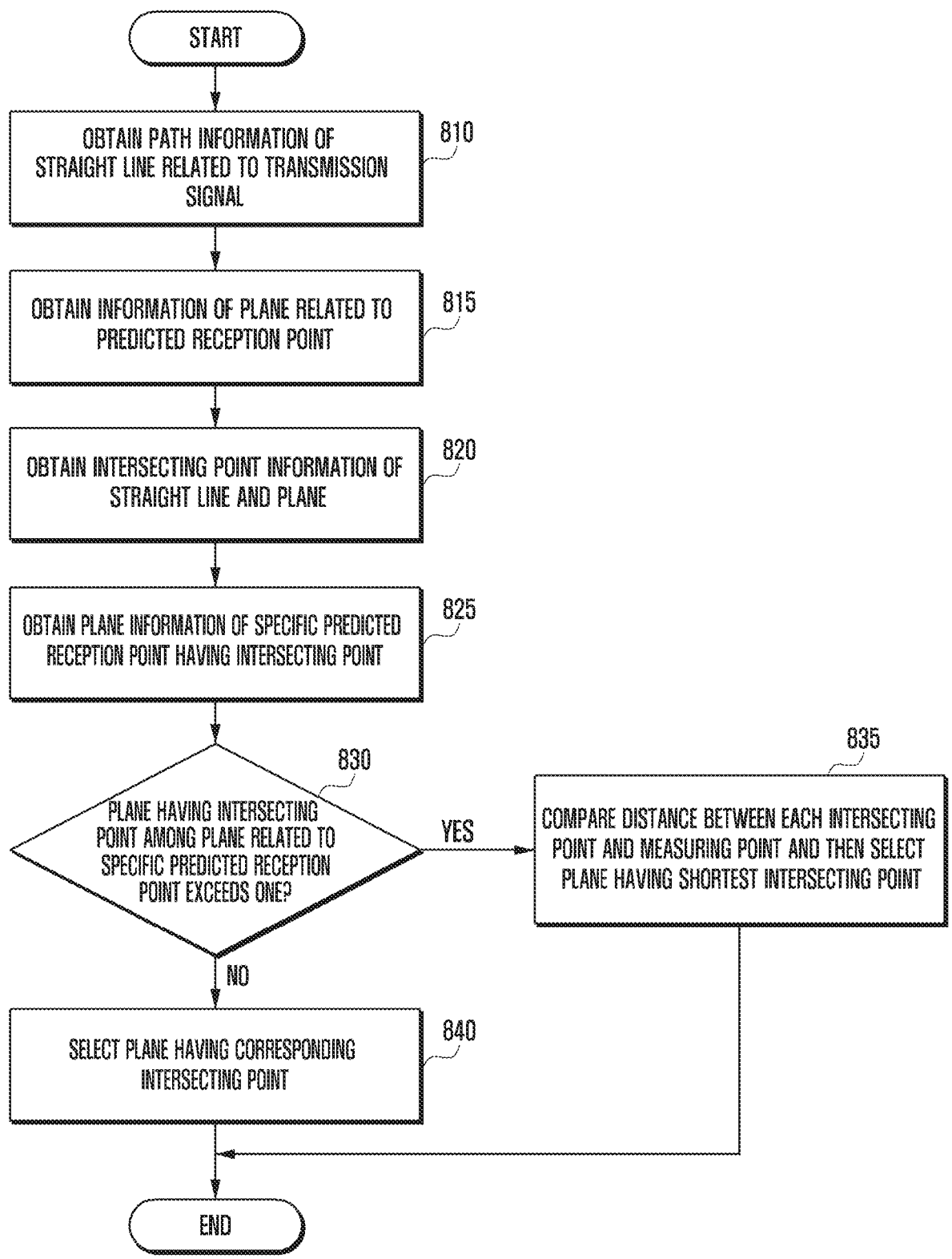
FIG. 8 is a diagram illustrating a method for determining a plane related to signal reception among planes intersecting with a straight line corresponding to a signal traveling direction according to an embodiment of the disclosure.

FIG. 8 is a diagram illustrating a method for determining a plane related to signal reception among planes intersecting with a straight line corresponding to a signal traveling direction according to an embodiment of the disclosure.

Referring to FIG. 8, it is possible to determine, based on information about a received signal in a drive test, whether there is a plane where a signal transmitted from a reception point intersects with a predicted reception point. When there is a plurality of intersecting planes, it is possible to determine on which plane the signal is received.

At step 810, the computing apparatus may obtain a path of a straight line corresponding to a transmission path of the straight line, based on direction information of a measured signal. The path of the straight line may be represented by an equation of a straight line in the three-dimensional coordinate system as described in the previous embodiment.

At step 815, the computing apparatus may obtain information of a plane related to a predicted reception point. Specifically, the predicted reception point may include a point or position where a user terminal can be located or a receiver or repeater is installed on a three-dimensional map. The computing apparatus may obtain information of a plane related to each predicted reception point. The plane information may be expressed in the three-dimensional coordinate system in the form of the equation described in the above embodiment.

At step 820, the computing apparatus may determine whether there is an intersecting point between a straight line and a plane, based on the information obtained at the step 810 and the information obtained at the step 815. Specifically, it is possible to determine whether there is a predicted reception point having a plane intersecting with the transmission signal path. There may be a signal having no plane intersecting with the predicted reception point. However, in this embodiment, such a signal may not be considered because it is a signal irrelevant to the predicted reception point.

At step 825, it is possible to predict, based on the information obtained at the step 820, plane information of a specific predicted reception point having an intersecting point with an extended straight line related to a transmission signal. Specifically, when there is an intersecting point between a plane forming a building A and an extended straight line related to a transmission signal, information of the plane forming the building A may be obtained.

At step 830, the computing apparatus may determine whether a plane having an intersecting point with the extended straight line related to the transmission signal exceeds one among the obtained planes. Specifically, because the extended straight line may pass through one plane and then intersect with another plane, it is needed to determine whether the number of intersecting points exceeds one.

When the number of intersecting points exceeds one, the computing apparatus may compare at step 835 a distance between a plane having each intersecting point and a measuring position where the signal is measured. Specifically, when a signal passes through one plane in an actual communication environment, the signal may experience a large amount of attenuation and thereby cannot affect an actual signal quality. Thus, in order to determine a plane on which the signal is actually received, a distance between an intersecting plane and a position at which the signal is received in the drive test is compared to determine that the signal is substantially received on a more adjacent plane. Then, by selecting the corresponding plane, the signal reception quality may be predicted.

When the number of intersecting points is one, the computing apparatus may determine at step 840 that the signal is received in a direction forming the corresponding plane, and select the plane to predict the signal reception quality.

Figure 9:
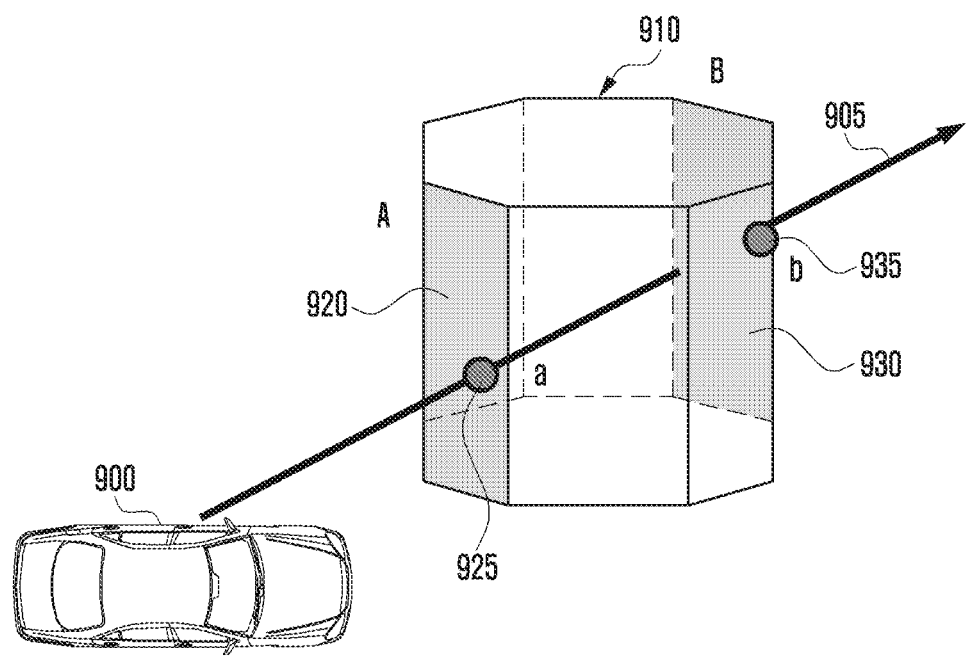
FIG. 9 is a diagram illustrating a case where a plurality of planes intersect with a straight line corresponding to a signal traveling direction according to an embodiment of the disclosure.

FIG. 9 is a diagram illustrating a case where a plurality of planes intersect with a straight line corresponding to a signal traveling direction according to an embodiment of the disclosure.

Referring to FIG. 9, a signal is received in a drive test apparatus 900, and an extended signal transmission path 905 may be determined based on information related to the signal. A predicted signal reception region 910 may be in the form of an octagonal column, which may vary depending on the type of an actual predicted signal reception region. In an embodiment, planes having an intersecting point between the extended signal transmission path 905 and the predicted signal reception region 910 are a plane A 920 and a plane B 930. An intersecting point a 925 and an intersecting point b 935 may be located in the corresponding region.

When the number of intersecting points exceeds one, a distance between a plane and the drive test apparatus 900 in which the signal is actually measured may be compared to determine a plane on which the signal is substantially received. In another embodiment, a distance between an intersecting point and the drive test apparatus 900 may be compared. In this embodiment, the plane A 920 is located closer to the signal reception position, so that the signal reception quality may be determined at a position corresponding to the plane A 920.

Figure 10:
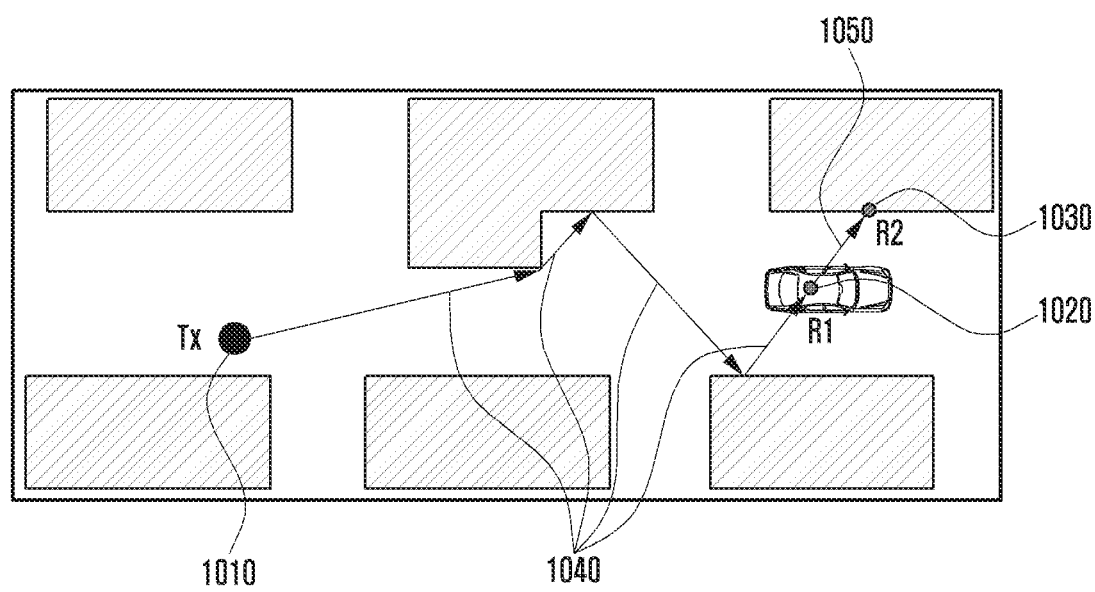
FIG. 10 is a diagram illustrating a signal propagation environment according to a signal transmission path in a drive test according to an embodiment of the disclosure.

FIG. 10 is a diagram illustrating a signal propagation environment according to a signal transmission path in a drive test according to an embodiment of the disclosure.

Referring to FIG. 10, a signal 1040 transmitted by a transmitter 1010 may be received at a drive test apparatus 1020. A distance from the transmitter 1010 to the drive test apparatus 1020 may be d1. Based on information related to the signal received at the drive test apparatus 1020, it is possible to determine that the signal will reach a predicted signal reception point 1030 through an extended path 1050 on which the signal will be transmitted. As described above, it is necessary to more accurately determine the signal reception quality at the predicted reception point 1030. In an embodiment, a distance 1050 from the drive test apparatus 1020 to the predicted signal reception point 1030 may be referred to as $d\Delta$. Therefore, a total distance from the transmitter 1010 to the predicted signal reception point 1030 may be determined as $d2=d1+d\Delta$. In an embodiment, the signal transmitted from the transmitter 1010 may experience attenuation while passing through a path of d2. Also, in an embodiment, the received signal strength at the predicted signal reception point 1030 may be calculated through the received signal strength at the drive test apparatus 1020. Specifically, when the power of a signal received at the drive test apparatus 1020 is PR1, and when the predicted received signal power at the predicted signal reception point 1030 is PR2, PR2 may be defined as follows.

$$PR2 \text{ (dB)}=PR1-20\times\log 10(d2/d1)=PR1-20\times\log 10\{(d1+d\Delta)/d1\}$$

In this case, the influences of obstacle, diffraction and reflection of the signal on a path from the transmitter 1010 to the drive test apparatus 1020 are reflected in the received signal power at the drive test apparatus 1020. Therefore, when a signal from the drive test apparatus 1020 to the predicted signal reception point 1030 complies with the FSPL (Free Space Path Loss) model, the power of a signal received at the predicted signal reception point 1030 may be determined by the above equation.

In an embodiment, the FSPL model according to the distance d may be determined as follows.

$$FSPL(d) \text{ (dB)}=A+B\times\log(d)$$

The values of A and B may vary depending on a measurement environment or setting and, for example, may be determined as follows.

$$FSPL(d) \text{ (dB)} = 61.4 + 20 \times \log(d)$$

As such, the power of the signal received at the predicted signal reception point 1030 may be more accurately inferred based on the signal transmission distance.

Figure 11:
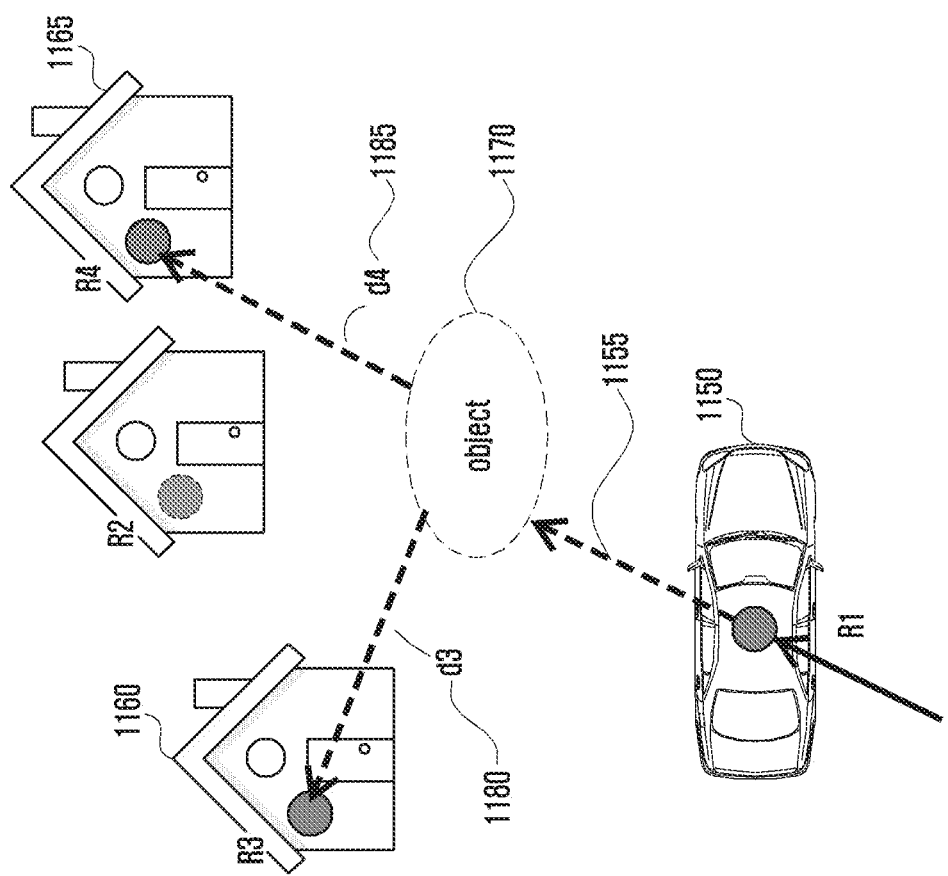
FIG. 11 is a diagram illustrating a method for reflecting a real environment in an extended propagation path in a drive test according to an embodiment of the disclosure.
Figure 11:
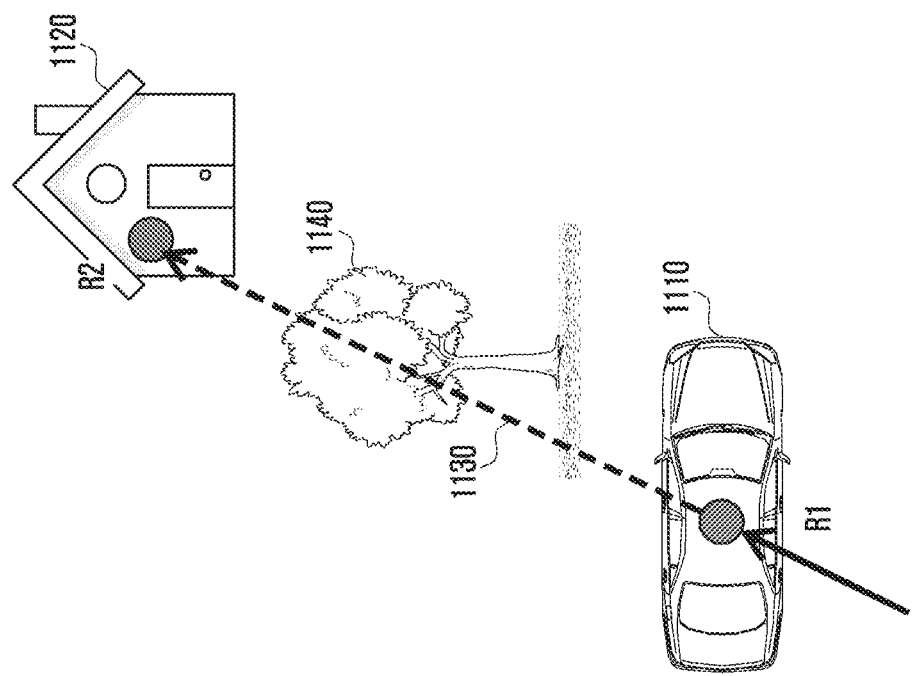

FIG. 11 is a diagram illustrating a method for reflecting a real environment in an extended propagation path in a drive test according to an embodiment of the disclosure.

Referring to FIG. 11, it is possible to consider the influence of signal propagation when an object causing absorption, scattering and reflection of a signal is located on a signal path extending from a drive test apparatus 1110 or 1150. Information about such an object may be determined through 3D map information or by mapping a result of extraction from 2D image information to 3D map information.

When there is an absorber 1140 such as a tree on an extended path 1130 of a signal from the drive test apparatus 1110 or 1120 to a predicted reception point 1120, the signal reception quality at the predicted signal reception point 1120 may be determined by reflecting signal attenuation information due to the absorber.

Specifically, the signal attenuation may be applied according to a model corresponding to the absorber (or transmitting body). For example, when it is determined that a signal passes through a 3-meter-sized tree, and when a loss of 7 dB/m due to the tree is applied, a total loss of 21 dB may occur. Therefore, in addition to the FSPL according to the total propagation distance, the signal loss due to the absorber may be reflected.

When an object 1170 that may cause scattering or reflection is located on a path 1150 extending from the drive test apparatus 1150, the signal reception quality may be determined at predicted signal reception points 1160 and 1165 changed in consideration of paths 1180 and 1185 by scattering or reflection of the signal.

Specifically, in an embodiment, distances to the predicted signal reception points 1160 and 1165 may be derived, and the influence of signal attenuation due to diffraction and scattering may be reflected. The influence of signal attenuation due to diffraction and scattering may be determined by an outer material of the object 1170. When a changed distance is denoted $dn$, and when the influence of signal attenuation due to diffraction and scattering is $EL_n$, the received signal power at $R_n$ may be determined as $$PR_n \text{(dB)} = PR1 - 20 \times \log 10(dn/d1) - EL_n.$$

Figure 12A:
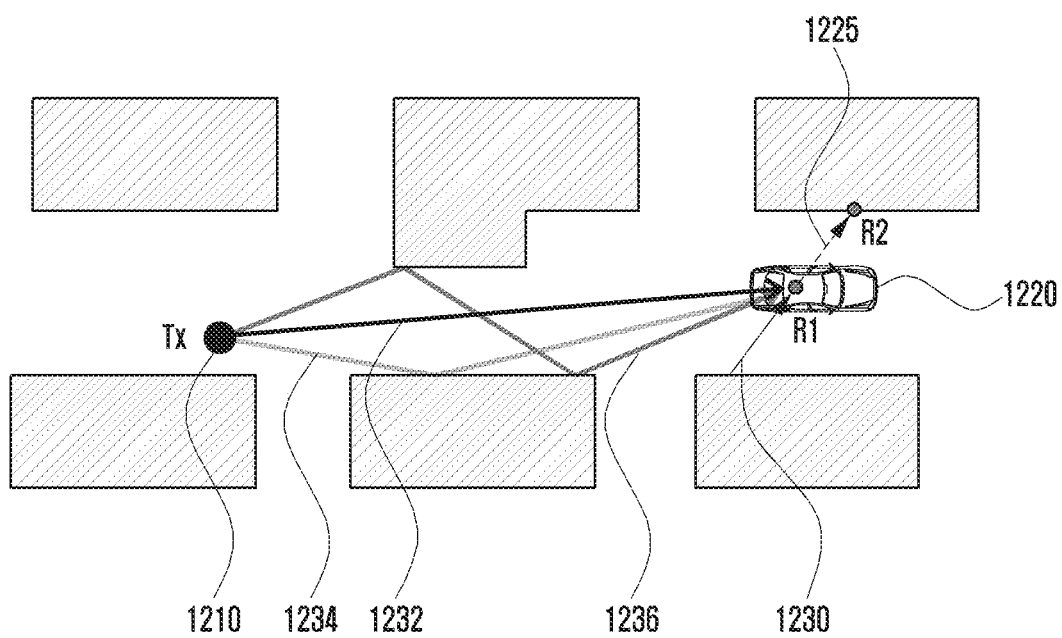
FIGS. 12A and 12B are diagrams illustrating a method for determining a signal propagation path from a transmission position to a drive test measurement position according to an embodiment of the disclosure.
Figure 12B:
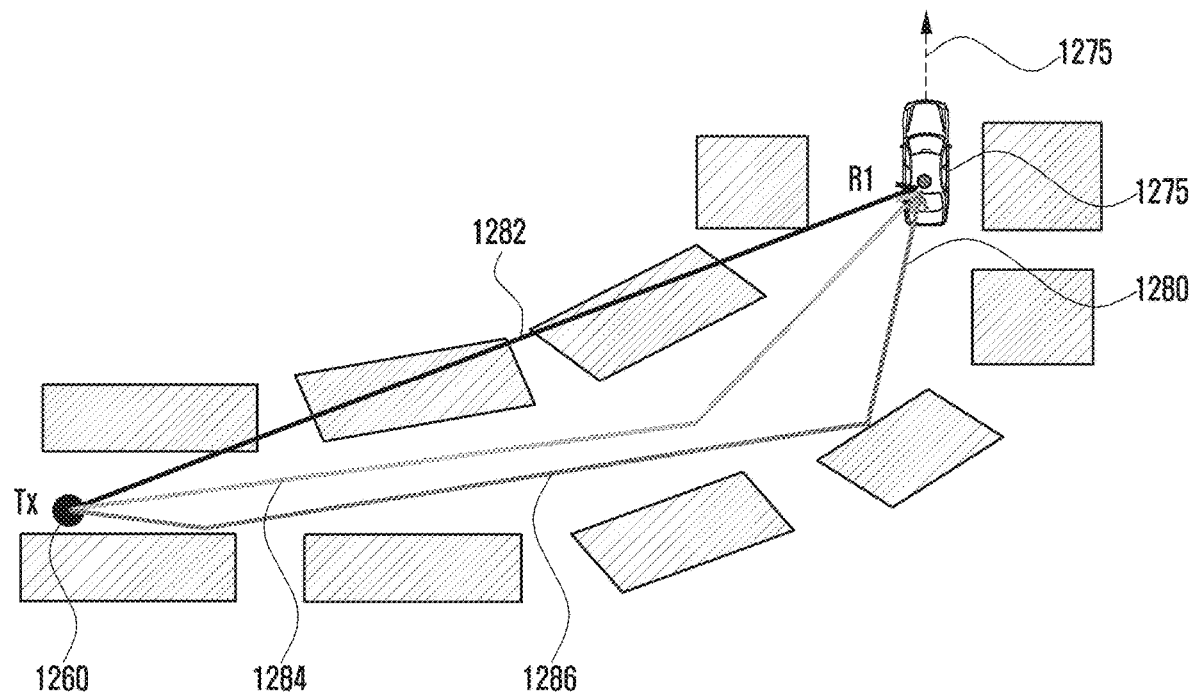

FIGS. 12A and 12B are diagrams illustrating a method for determining a signal propagation path from a transmission position to a drive test measurement position according to an embodiment of the disclosure.

Referring to FIGS. 12A and 12B, a signal propagation path between a transmitter 1210 or 1260 and a drive test apparatus 1220 or 1270 may be predicted.

In FIG. 12A, a signal 1230 transmitted by the transmitter 1210 may be received at the drive test apparatus 1220. In an embodiment, there may be one or more paths through which the signal is transmittable from the transmitter 1210 to the drive test apparatus 1220. The one or more paths may include a first path 1232, a second path 1234, and a third path 1236. In another embodiment, a plurality of paths may be predicted in consideration of signal characteristics and reflection.

The computing apparatus may select a path most similar to an actual path among the first to third paths 1232, 1234, and 1236. Specifically, a path having an AOA most similar to that of a received signal 1130 may be determined as a signal transmission path. In an embodiment, because the AOA of the third path 1236 is the most similar path to that of an actually received signal 1230, it is possible to determine the signal transmission path from the transmitter 1210 to the drive test apparatus 1220, based on the third path 1236.

In FIG. 12B, a signal 1280 transmitted by the transmitter 1260 may be received at the drive test apparatus 1270. In an embodiment, there may be one or more paths through which the signal is transmittable from the transmitter 1260 to the drive test apparatus 1270. The one or more paths may include a first path 1282 and a second path 1284. In another embodiment, a plurality of paths may be predicted in consideration of signal characteristics and reflection.

The computing apparatus may select a path that is similar to an actual path between the first and second paths 1282 and 1284. Specifically, a signal transmission distance may be determined based on the first path 1282 of a straight line in order to perform an easier computation, or a signal transmission distance may be determined based on the second path 1284 having a trace corresponding to a road.

In order to perform signal path tracing, a complex computation is required, and one of possible paths may be selected. Even in case of simplification, an error occurring in calculation is relatively small when a distance from the transmitter to the drive test apparatus is relatively large, so that the signal transmission distance may be calculated based on this.

Figure 13:
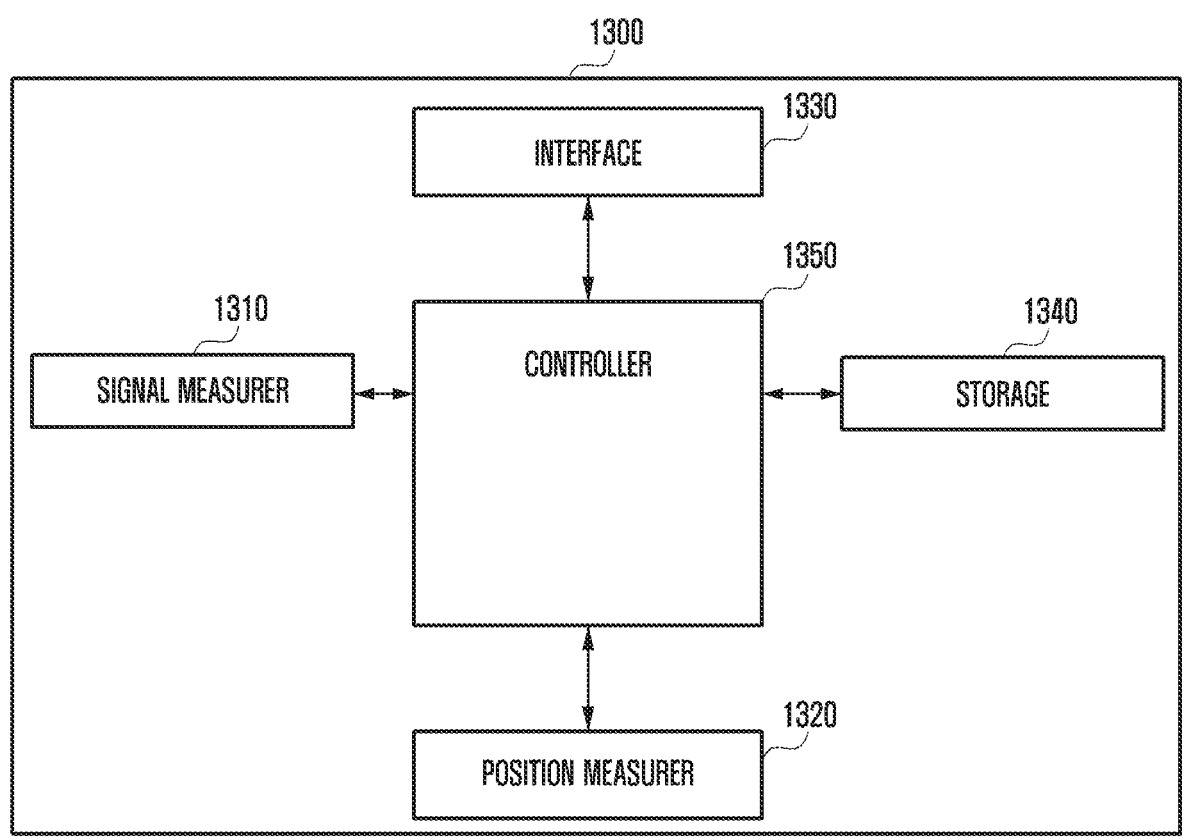
FIG. 13 is a diagram illustrating a computing apparatus according to an embodiment of the disclosure.

FIG. 13 is a diagram illustrating a computing apparatus according to an embodiment of the disclosure.

Referring to FIG. 13, the computing apparatus 1300 may include a signal measurer 1310, a position measurer 1320, an interface 1330, a storage 1340, and a controller 1350. In an embodiment, the computing apparatus 1330 includes, but is not limited to, components capable of performing both measurement and post-processing. The computing apparatus may receive information measured by a drive test apparatus including a component for measurement through the interface 1330 and, based on the received information, perform post-processing to determine the signal reception quality at a predicted reception point. The computing apparatus 1300 of this embodiment may perform signal measurement and post-processing together.

The signal measurer 1310 may measure the power and direction information of a received signal. In an embodiment, the signal measurer 1310 may include an omnidirectional antenna or an antenna in which a plurality of antennas are arranged in all directions.

The position measurer 1320 may measure a position where a signal is received. Specifically, the position measurer may include a GPS module or the like to measure a position and map the measured position on a three-dimensional map. Also, a time when the signal is measured may be recorded together with the position measurement.

The interface 1330 may transmit and receive data to and from any other apparatus. Specifically, it is possible to receive at least one of measurement data and three-dimensional map information from the other apparatus through the interface 1330.

The storage 1340 may store at least one of measured information and received information, and may store data post-processed based on such information.

The controller 1350 may control the computing apparatus 1300 to perform operations of an embodiment. Specifically, the controller may perform signal measurement through the signal measurer 1310 and the position measurer 1320, perform post-processing together with information received via the interface 1330, and thereby determine the signal reception quality at a predicted reception point.

Although embodiments have been described based on the drive test in connection with technical features of the disclosure, this is merely an example. As apparent, the described embodiments may be also applied to MDT (Minimization of Drive Tests) that performs the drive test through a user terminal being used actually. Specifically, the terminal may receive and store a signal to perform the drive test in an idle mode or a connected mode. The stored information may include position information, received signal power information, and signal reception direction information. A base station may perform a post-processing operation based on the collected MDT information and determine a signal reception environment at an actual reception point.

While the disclosure has been described in detail with reference to specific embodiments, it is to be understood that various changes and modifications may be made without departing from the scope of the disclosure. Therefore, the scope of the disclosure should not be limited by embodiments described herein, but should be determined by the scope of the appended claims and equivalents thereof.

The invention claimed is:

1. A method for determining a signal reception quality in a mobile communication system, the method comprising:
    measuring a signal transmitted by a transmitter;
    obtaining measurement information at a current measurement location including at least one of a measuring position of the signal, a reception quality of the signal, and a reception direction of the signal;
    determining information related to a first path extended from the measuring position and through which the signal will be traveled, based on the measurement information;
    determining a candidate object located on the first path among at least one signal reception candidate;
    determining a predicted signal reception region, based on the candidate object and the information related to the first path; and
    determining the signal reception quality in the predicted signal reception region, based on the measurement information.

2. The method of claim 1, wherein the determining the signal reception quality includes determining the quality of the signal, based on a distance of the first path and at least one of diffraction, reflection and scattering due to an object on the first path.

3. The method of claim 1, wherein the measurement information excludes information about a signal transmitted on a path corresponding to a line of sight between the measuring position of the signal and the transmitter.

4. The method of claim 1, wherein the determining the predicted signal reception region includes:
    obtaining information of at least one plane constituting the candidate object located on the first path;
    determining a plane having a point intersecting with a straight line corresponding to the first path among the at least one plane; and
    determining the predicted signal reception region based on a plane adjacent to the measuring position of the signal when two or more planes have the intersecting point.

5. The method of claim 1, wherein the determining the signal reception quality includes determining the signal reception quality, based on a length of a second path on which the signal is transmitted from the transmitter to the measuring position of the signal.

6. The method of claim 5, further comprising:
    determining at least one candidate path on which the signal is transmittable from the transmitter to a signal reception position; and
    determining, as the second path, one of the at least one candidate path, based on the reception direction of the signal and an angle of arrival when the candidate path arrives at the measuring position of the signal.

7. The method of claim 1, wherein the determining the signal reception candidate includes:
    determining at least one building, based on map information; and
    determining the at least one building as the signal reception candidate.

8. A computing apparatus for determining a signal reception quality in a mobile communication system, the apparatus comprising:
    a transceiver; and
    a controller configured to:
        control the transceiver, to measure a signal transmitted by a transmitter,
        obtain measurement information at a current measurement location including at least one of a measuring position of the signal, a reception quality of the signal, and a reception direction of the signal,
        determine information related to a first path extended from the measuring position and through which the signal will be traveled, based on the measurement information,
        determine a candidate object located on the first path among at least one signal reception candidate,
        determine a predicted signal reception region, based on the candidate object and the information related to the first path, and
        determine the signal reception quality in the predicted signal reception region, based on the measurement information.

9. The apparatus of claim 8, wherein the controller is further configured to:
    determine the quality of the signal, based on a distance of the first path and at least one of diffraction, reflection and scattering due to an object on the first path.

10. The apparatus of claim 8, wherein the measurement information excludes information about a signal transmitted on a path corresponding to a line of sight between the measuring position of the signal and the transmitter.

11. The apparatus of claim 8, wherein the controller is further configured to:
    obtain information of at least one plane constituting the candidate object located on the first path,
    determine a plane having a point intersecting with a straight line corresponding to the first path among the at least one plane, and
    determine the predicted signal reception region based on a plane adjacent to the measuring position of the signal when two or more planes have the intersecting point.

12. The apparatus of claim 8, wherein the controller is further configured to:
    determine the signal reception quality, based on a length of a second path on which the signal is transmitted from the transmitter to the measuring position of the signal.

13. The apparatus of claim 12, wherein the controller is further configured to:
- determine at least one candidate path on which the signal is transmittable from the transmitter to a signal reception position, and
- determine, as the second path, one of the at least one candidate path, based on the reception direction of the signal and an angle of arrival when the candidate path arrives at the measuring position of the signal.

14. The apparatus of claim 8, wherein the controller is further configured to:
- determine at least one building, based on map information, and
- determine the at least one building as the signal reception candidate.

15. A non-transitory storage medium storing a program comprising instructions for executing the method of claim 1.

* * * * *